(12) United States Patent
Nagurka et al.

(10) Patent No.: US 11,504,834 B2
(45) Date of Patent: Nov. 22, 2022

(54) SMART TRIGGER SYSTEM

(71) Applicant: Marquette University, Milwaukee, WI (US)

(72) Inventors: Mark L. Nagurka, Glendale, WI (US); Richard W. Marklin, Jr., Wauwatosa, WI (US)

(73) Assignee: Marquette University, Milwaukee, WI (US)

( * ) Notice: Subject to any disclaimer, the term of this patent is extended or adjusted under 35 U.S.C. 154(b) by 449 days.

(21) Appl. No.: 16/093,714

(22) PCT Filed: Apr. 15, 2016

(86) PCT No.: PCT/US2016/027867
§ 371 (c)(1),
(2) Date: Oct. 15, 2018

(87) PCT Pub. No.: WO2017/180155
PCT Pub. Date: Oct. 19, 2017

(65) Prior Publication Data
US 2019/0126451 A1     May 2, 2019

(51) Int. Cl.
*B25C 1/00* (2006.01)
*B25C 1/04* (2006.01)
*G01N 21/25* (2006.01)

(52) U.S. Cl.
CPC ............... *B25C 1/008* (2013.01); *B25C 1/04* (2013.01); *G01N 21/255* (2013.01)

(58) Field of Classification Search
CPC .......... B25C 1/008; B25C 1/04; G01N 21/255
(Continued)

(56) References Cited

U.S. PATENT DOCUMENTS 3,910,701 A * 10/1975 Henderson ........... G01N 21/474
356/39
5,004,349 A * 4/1991 Sato ..................... G01N 21/255
315/151
(Continued)

FOREIGN PATENT DOCUMENTS

JP       05-057635       *  3/1993   ............... B25C 1/06
RU       2372552 C2       11/2009
(Continued)

OTHER PUBLICATIONS

International Preliminary Search Report and Written Opinion for International Application No. PCT/US2016/027867 dated Oct. 16, 2018.
(Continued)

*Primary Examiner* — Michelle Lopez
(74) *Attorney, Agent, or Firm* — Andrus Intellectual Property Law, LLP

(57) ABSTRACT

An actuation system for preventing actuation of a base device upon a non-target substrate. The actuation system includes a detector configured to generate and transmit a profile signal of a test substrate. A processing unit is in communication with the detector and configured to receive the profile signal of the test substrate from the detector, the processing unit being configured to determine whether the profile signal of the test substrate corresponds to a profile signal of a target substrate, and to generate an actuation signal if the profile signal of the test substrate corresponds to the profile signal of the target substrate. An actuation unit is in communication with the processing unit and the base device, the actuation unit being configured to receive the actuation signal from the processing unit and to permit the base device to actuate when receiving the actuation signal.

16 Claims, 4 Drawing Sheets

(58) Field of Classification Search
USPC .......................................... 227/2; 173/2, 90
See application file for complete search history.

(56) References Cited

U.S. PATENT DOCUMENTS

| | | | | |
|---|---|---|---|---|
| 5,088,817 | A * | 2/1992 | Igaki | G06K 9/00046 250/556 |
| 5,595,336 | A | 1/1997 | Everdyke | |
| 5,921,367 | A * | 7/1999 | Kashioka | F16P 3/144 192/130 |
| 6,123,241 | A * | 9/2000 | Walter | B25C 1/08 123/46 SC |
| 6,471,106 | B1 * | 10/2002 | Reining | B25C 1/008 227/156 |
| 8,763,721 | B2 * | 7/2014 | Koeder | G06T 7/13 173/20 |
| 10,717,178 | B2 * | 7/2020 | Yamamoto | B25C 1/008 |
| 2010/0091272 | A1 * | 4/2010 | Asada | G01N 21/55 356/237.2 |
| 2014/0240477 | A1 * | 8/2014 | Feng | G06T 5/008 348/77 |
| 2015/0122870 | A1 * | 5/2015 | Zemlok | H02P 7/29 227/176.1 |
| 2016/0155006 | A1 * | 6/2016 | Makkapati | G06K 9/00362 382/128 |
| 2016/0171684 | A1 * | 6/2016 | De Haan | G06K 9/4652 382/103 |
| 2019/0126451 | A1 * | 5/2019 | Nagurka | B25C 1/008 |
| 2020/0039046 | A1 * | 2/2020 | Takidis | B25C 1/06 |

FOREIGN PATENT DOCUMENTS

| | | |
|---|---|---|
| RU | 2440887 C2 | 1/2012 |
| SU | 198609 A | 8/1967 |

OTHER PUBLICATIONS

International Search Report and Written Opinion for International Application No. PCT/US2016/027867 dated Dec. 29, 2016.
Examination Report for Canadian Patent Application No. 3,020,962, dated Apr. 14, 2022.

* cited by examiner

SMART TRIGGER SYSTEM

CROSS-REFERENCE TO RELATED APPLICATIONS

This application claims priority to PCT/US2016/027867, filed Apr. 15, 2016 and published in English on Oct. 19, 2017 as publication number WO 2017/180155 A1, the disclosure of which are incorporated herein by reference.

BACKGROUND

The field of the invention generally relates to a system, method, and apparatus for activation of devices, including fastening devices, with reduced risk of injury. More specifically, the field of the invention relates to reducing the risk of injury due to accidental discharge of a fastening device. This invention may be referred to as a "smart trigger system" in the present application.

Mechanically or electrically powered fastener devices are commonly used in construction and manufacturing, particularly in high-volume fabrication and production. These devices are particularly useful for repetitive, intensive operations, such as nailing wooden stud, floor joists, and plywood sheathing, or fastening roofing materials. These tools are often powered by compressed air, gas, hydraulic fluid, electricity, or other means and are commonly actuated by use of a finger trigger.

There are two predominant trigger systems used to discharge, or project, a fastener from a fastener tool. These are known as Contact Actuation Trigger (CAT) and Sequential Actuation Trigger (SAT) systems. A tool using the CAT system discharges a fastener when a user pulls the trigger and presses the nosepiece against a material, in any sequence order. Either the trigger must be released or the nosepiece must be removed from the material before a second fastener can be discharged. In contrast, a tool using the SAT system discharges a fastener when the nosepiece and trigger are activated in a specific order, also requiring both the nosepiece and trigger to be released before the next fastener can be discharged.

A third trigger system known in the industry is a Single Sequential Trigger. This system, which is a variation of the SAT system, discharges a fastener when the nosepiece is first pressed and held against a material while the trigger is subsequently pulled. A second fastener is discharged when the nosepiece, pressed against the material, is slid along the material and the trigger is released after the first discharge, and then pulled again. Each discharge of a fastener requires a separate release and pull of the trigger while the nosepiece is held pressed against the material. Wood framers, finish carpenters, and roofers sometimes use the Single Sequential Trigger when they are working on long, flat surfaces that requires many fasteners. Regardless of the power source (mechanical, electrical, gas, fluid, hybrid, or other), the CAT and SAT systems are the most common trigger systems on construction and manufacturing sites.

Presently, there is a risk of injury related to the use of powered fastener devices. In the case of pneumatic nail driving tools, two prominent injury scenarios were reported from major studies conducted by the U.S. Consumer Product Safety Commission (CPSC) in 2002 and by the U.S. Centers for Disease Control (CDC) in 2007. The data for these studies were collected by the National Electronic Injury Surveillance System (NEISS), which records incident reports of cases treated at emergency departments of major U.S. hospitals. The two major injury scenarios were accidental discharge and accidental contact. These accounted for 62% and 47% of the injuries to non-occupational and occupational operators, respectively (U.S.CPSC, 2002A, 2002B). Within the accidental discharge category, 74% of non-occupational operators and 83% of occupational operators had their fingers on the trigger when their nail driver accidentally discharged. In the accidental contact category of the CPSC studies, 91% and 87% of non-occupational and occupational operators, respectively, had their fingers on a nail driver trigger when they unintentionally touched the tip of the pneumatic tool with something (e.g., a body part) other than the intended work piece.

Puncture wounds were the most common nail driver injuries (Dement et al., 2003), and nail driver injuries affected the hands or fingers in approximately two-thirds of all injuries (Baggs et al., 2001; U.S.CPSC, 2002A, 2002B; Lipscomb et al., 2003B). Of the accidental discharge injuries in the two CPSC studies, 95% and 78% were to the upper arm, wrist, hand, or fingers of non-occupational and occupational operators, respectively. Of the accidental contact injuries, the most frequently injured body parts were the thigh, knee, lower leg, and foot.

The first calculations of the incident rates (IRs) of nail driver injuries were reported in two studies: 31,118 worker compensation claims among 7,400 workers from 1986-1994 (Dement et al., 1999) and reported nail driver injuries from 13,347 carpenters in Ohio (OH) from 1994-1997 and a cohort of 7,500 construction workers in North Carolina (NC) from 1996-1999 (Dement et al., 2003). In the NC study the IR for all injuries resulting in lost time or medical cost was greatest for residential carpenters (IR=15.4). The overall 'lost time-medical cost' IR for all injuries for all workers was 8.7. The highest 'lost time-medical cost' IR occurred for cases defined as "struck by" (IR=3.1), which included acute injuries from nail drivers. In the cohorts of construction workers (Dement et al., 2003), the nail driver IR was 0.33 and 0.26 in NC and OH, respectively. Nail driver injuries accounted for 8.3% to 25.5% of all lost work time claims. Seventy percent (70%) of the nail driver injuries occurred in framing and sheathing tasks.

In a case report study from Washington state (Baggs et al., 2001), worker compensation claims associated with nail drivers were reported from 1990-1998. Seventy-three percent (73%) of the nail driver injuries occurred in the construction industry, with Wood Frame Building Construction workers accounting for 55% of all nail driver claims 2,002 of 3,616 total). In the manufacturing industry sector, Wood Products Manufacturing resulted in the highest number of claims associated with nail drivers (7%). The average nail driver IR was 0.03 per 200,000 hours for all construction workers. The average IR was highest (IR=2.06) for workers in the Wood Frame Building Construction and second highest (IR=0.66) for Interior Finish Carpentry. The IRs for nail drivers for these two sectors increased per year on average 6.5% and 4.1%, respectively, from 1990-1998.

SUMMARY

Disclosed are systems, methods, and apparatuses that may be utilized for preventing actuation of a base device upon a non-target substrate. The disclosed systems, methods, and apparatuses may include or utilize a detector configured to generate and transmit a profile signal of a test substrate and a processing unit in communication with the detector and configured to receive the profile signal of the test substrate from the detector. The processing unit further may be configured to determine whether the profile signal of the test substrate corresponds to a profile signal of a target substrate and to generate an actuation signal if the profile signal of the test substrate corresponds to the profile signal of the target substrate. The disclosed systems, methods, and apparatuses may include or utilize an actuation unit in communication with the processing unit and the base device, which is configured to receive the actuation signal from the processing unit and to permit the base device to actuate upon receiving the actuation signal.

Various other features, objects and advantages of the invention will be made apparent from the following description taken together with the drawings.

DETAILED DISCLOSURE

Figure 1:
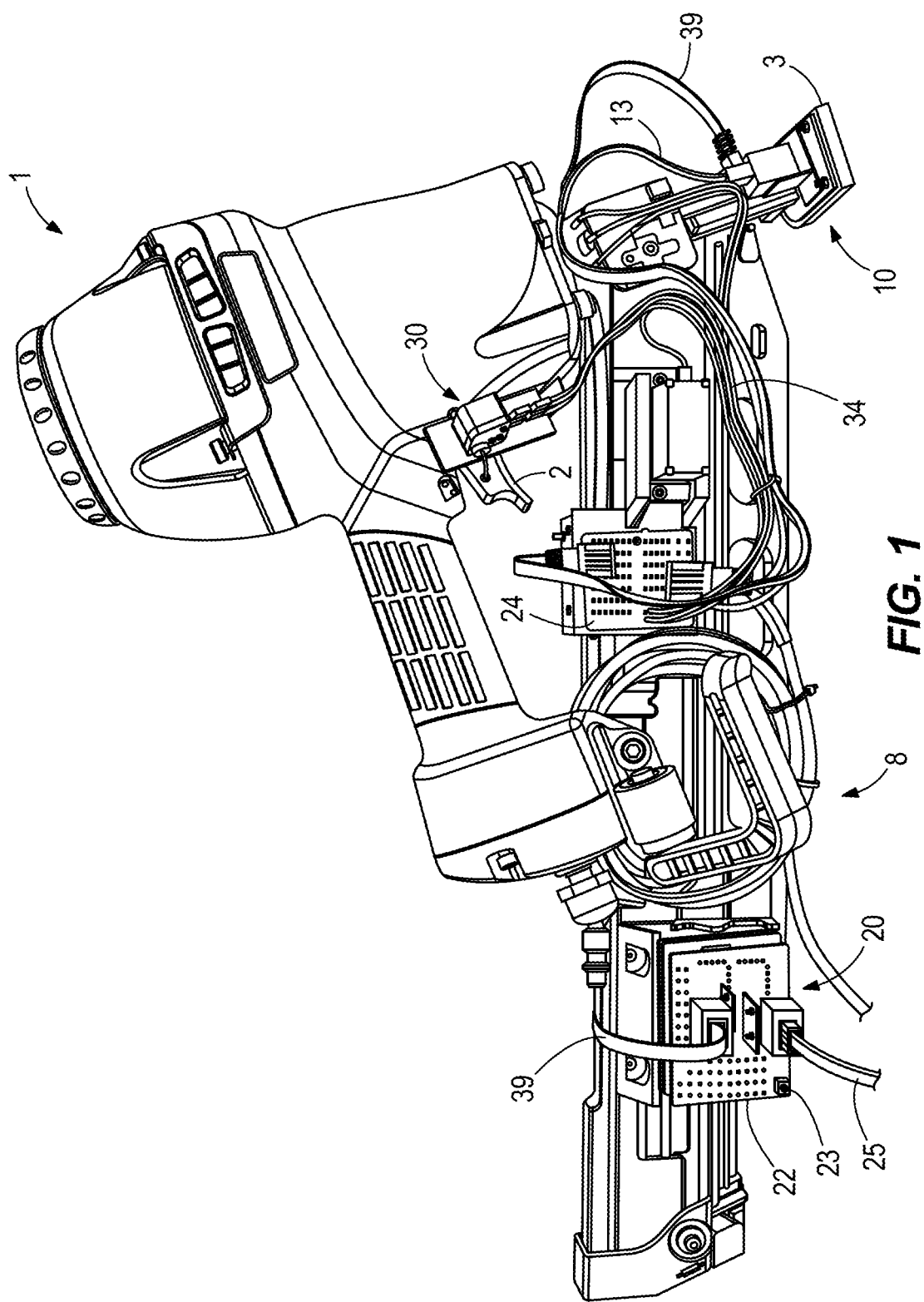
FIG. 1 is a right side view of a fastener tool that includes the smart trigger system of the present disclosure.

The subject matter disclosed herein is described using several definitions, as set forth below and throughout the application.

Unless otherwise specified or indicated by context, the terms "a," "an," and "the," mean "one or more." For example, "a detector," "a processing unit," and "an actuation unit," should be interpreted to mean "one or more detectors," "one or more processing units," and "one or more actuation units," respectively.

As used herein, "about," "approximately," "substantially," and "significantly" will be understood by persons of ordinary skill in the art and will vary to some extent on the context in which they are used. If there are uses of these terms which are not clear to persons of ordinary skill in the art given the context in which they are used, "about," "approximately," "substantially," and "significantly" will mean within ±10% of the particular term.

As used herein, the terms "include" and "including" have the same meaning as the terms "comprise" and "comprising." The terms "comprise" and "comprising" should be interpreted as being "open" transitional terms that permit the inclusion of additional components further to those components recited in the claims. The terms "consist" and "consisting of should be interpreted as being "closed" transitional terms that do not permit the inclusion of additional components other than the components recited in the claims. The term "consisting essentially of should be interpreted to be partially closed and allowing the inclusion only of additional components that do not fundamentally alter the nature of the subject matter recited in the claims.

The presently disclosed systems, methods, and apparatuses may include, utilize, or operate on a "base device." As used herein, the term "base device" should be interpreted broadly to include any device that may be actuated by a user. Base devices may include but are not limited to fastening devices that discharge fasteners. Fasteners may include but are not limited to nails, staples, pins, and screws.

The presently disclosed systems, methods, and apparatuses may include or utilize a "profile signal." The term "profile signal" should be interpreted broadly to include any signal, including an electrically transmitted signal composed of elements that may be utilized to identify something, such as a test substrate, a target substrate, and/or a non-target substrate. In an exemplary embodiment, the profile signal of the test substrate can be compared with the profile signals of one or more target substrates and/or the profile signals of one or more non-target substrates to determine if the test substrate corresponds to a target substrate, a non-target substrate, or neither.

The presently disclosed systems, methods, and apparatuses may be configured so as to permit a fastener being inserted into target substrate. Exemplary target substrates include but are not limited to timber, dimensioned lumber, plywood products, paneling, wall coverings, trim pieces, roofing materials, and foundation materials such as concrete block and poured concrete items.

The presently disclosed systems, methods, and apparatuses may be configured so as to prevent a fastener from being inserted into a non-target substrate. Exemplary non-target substrates include but are not limited to human skin or anything worn by the user, such as clothes, hats, shoes, and belts. As such, the non-target profile signal can be considered a "lock-out" profile signal.

As utilized herein, a profile signal of a target substrate may be generated by manual calibration on-site or it may be entered by the user, supervisor, or tool manufacturer prior to the tool's use. In one embodiment, the user may manually calibrate the base device by pressing the nosepiece of the tool against the target substrate and following the initial sequence, which results in a target profile signal. In another embodiment, the profile signal may be programmed into the base device without manual calibration. For example, the user or supervisor could enter the target profile signal through an interactive display on the base device or on a remote device, such as a smartphone, or the manufacturer could program the target profile signal into the base device during original manufacturing.

As contemplated herein, a profile signal of a non-target substrate may be programmed into the base device during original manufacture or subsequently by the user, supervisor, or tool manufacturer prior to the tool's use. In one embodiment, the manufacturer of the base device or the user or supervisor could select a profile signal of a non-target substrate from various sources, such as manufacturers of clothing and shoes or databases.

Actuation Systems, Methods, and Apparatuses

Through research and experimentation, the applicants have determined that there is a risk of injury for workers using fastener tools with any of the trigger mechanisms, which include the Sequential Actuation Trigger (SAT) and the Contact Actuation Trigger (CAT) actuation systems.

To actuate a SAT tool, a worker first presses and holds the tool's nosepiece against the work surface, then pulls the trigger to insert a fastener. The worker must remove contact of the nosepiece from the substrate and release the trigger before another fastener can be discharged. The sequence is: 1) first press and hold the nosepiece against a work piece, 2) pull the trigger, 3) remove the contact between the nosepiece and the work piece, and 4) release the trigger. The SAT system significantly slows the production rate of the tool—the number of fasteners installed per unit time.

In the case of CAT tools, workers typically use the tool in what is known as a "bump" mode. To operate a CAT tool in bump mode, the trigger is pulled and held while the nosepiece is bumped against a material, discharging a fastener with each bump. The applicants have found that the recoil caused by the discharge of a fastener may be advantageous in assisting the user to move the tool to a next location for discharging a fastener with the next bump. Wood frame residential and commercial carpenters and roofers typically use the CAT bump method to insert fasteners because they can insert many fasteners per unit time and the production rate is greater than tools with a SAT system. However, by continuously holding down the actuation trigger, there is a greater incidence for injury. The risk of injury with CAT systems is twice as great as with SAT systems (Lipscomb, et al., 2006; Lipscomb, et al, 2010C). Despite this increased risk for injury, the present applicants have found that workers continue to use and prefer CAT systems and the bump method for the high productivity output.

Accordingly, the present applicants have determined that there is a need for a smart trigger system that can minimize the possibility of accidental discharge of a fastener into a non-target substrate without decreasing the productivity of the base device.

It should also be noted that while this disclosure references a smart trigger system for use with fastener tools, the present disclosure may apply to other methods or devices related to actuation of projectiles, or other applications of engaging or modifying a substrate. As non-limiting examples, this could include saws, presses, crushers, or firearms.

The disclosed actuation system may be configured for preventing actuation of a base device upon a non-target substrate. In some embodiments, the actuation system comprises: (a) a detector, which may be configured to generate and transmit a profile signal of a test substrate; (b) a processing unit in communication with the detector and configured to receive the profile signal of the test substrate from the detector, and preferably the processing unit being configured to determine whether the profile signal of the test substrate corresponds to a profile signal of a target substrate, and to generate an actuation signal if the profile signal of the test substrate corresponds to the profile signal of the target substrate; and (c) an actuation unit in communication with the processing unit and the base device, the actuation unit being configured to receive the actuation signal from the processing unit and to permit the base device to actuate when receiving the actuation signal. In the disclosed actuation systems, the base device may include a fastening device that discharges a fastener. In the disclosed systems, the non-target substrate may include body part of a user of the base device.

The disclosed actuation systems typically include a processing unit that determines whether the profile signal of the test substrate corresponds to a profile signal of a non-target substrate. Typically, where the processing determines that the profile signal of the test substrate corresponds to a profile signal of a non-target substrate, the processing unit will not allow the base device to discharge a fastener.

The disclosed actuation systems typically include a detector. In some embodiments, the detector comprises an emitter element for energy at the test substrate and a sensor element for detecting energy reflected from the test substrate, the sensor element generating the profile signal for the test substrate based on the detected energy reflected from the test substrate. In further embodiments, the detector comprises a light emitter element for emitting light on the test substrate and a light sensor element for detecting light reflected from the test substrate, the light sensor element generating the profile signal for the test substrate based on the detected light reflected from the test substrate.

In the disclosed actuation systems, the profile signal of the target substrate may be generated by placing the detector onto the target substrate to generate the profile signal of the target substrate. In some embodiments, the profile signal of the target substrate may be transmitted and stored in the processing unit. The profile signal of the test substrate and/or the profile signal of the target substrate may be generated based on steps that include, but are not limited to: detecting the frequency range of light reflected from the test substrate, detecting the contrast of light reflected from the substrate, detecting the intensity of light reflected from the substrate, and combinations thereof.

In some embodiments of the disclosed actuation systems, the light emitter may emit light within four frequency ranges corresponding to red light, green light, blue light, and white light. Furthermore, the light sensor may sense light within the four frequency ranges and may determine light intensity levels for light within each of the four frequency ranges, namely $I_{red/test}$, $I_{green/test}$, $I_{blue/test}$, and $I_{white/test}$, to generate the profile signal of the test substrate.

In some embodiments, the profile signal of the target substrate may include light intensity levels for light within each of the four frequency ranges corresponding to red light, green light, blue light, and white light, namely $I_{red/target}$, $I_{red/target}$, $I_{blue/target}$, and $I_{white/target}$, and the processing unit may compare each of the light intensity levels of the profile signal of the test substrate with each the corresponding light intensity levels of the profile signal of the target substrate to generate comparison error ratios, namely $R_{red}=(I_{red/target}-I_{red/test})/I_{red/target}$; $R_{green}=(I_{green/target}-I_{green/test})/I_{green/target}$; $R_{blue}=(I_{blue/target}-I_{blue/test})$; and $R_{white}=(I_{white/target}-I_{white/test})/I_{white/target}$. Furthermore, the processing unit may determine that the profile signal of the test substrate corresponds to the profile signal of the target substrate when each of the following equations are satisfied: $R_{red}<V$; $R_{green}<V$; $R_{blue}<V$; and $R_{white}<V$; where V is a variable value (e.g., a variable value within the range of 0-5%, such as 0.5, 1.0, 1.5, 2.0, 2.5, 3.0, 3.5, 4.0, 4.5, 5.0, or a variable value range bounded by any of these variable values). In some embodiments, the actuation system further may include a modulator for changing the value of variable V.

In some embodiments of the disclosed actuation systems, the systems may include: (a) a detector configured to generate and transmit a profile signal of a test substrate, the detector further comprising a light emitter element for emitting light on the test substrate and a light sensor element for detecting light reflected from the test substrate, wherein the profile signal of the test substrate is generated based on the detected light reflected from the test substrate; (b) a processing unit in communication with the detector and configured to receive the profile signal of the test substrate from the detector, the processing unit being configured to determine whether the profile signal of the test substrate corresponds to a profile signal of a target substrate, and to generate an actuation signal if the profile signal of the test substrate corresponds to the profile signal of the target substrate; and (c) an actuation unit in communication with the processing unit and the base device, the actuation unit being configured to receive the actuation signal from the processing unit and to permit the base device to actuate when receiving the actuation signal; where when the profile signal of the test substrate does not correspond to the profile signal of the target substrate, the test substrate is a non-target substrate. In further embodiments of the disclosed actuation systems, the processing unit determination of whether the profile signal of the test substrate corresponds to the profile signal of the target substrate may be at least partially based on an expected light contribution from the light emitter element, where if the profile signal of the test substrate or the profile signal of the target substrate is outside an expected range corresponding to the expected light contribution from the light emitter element, an error signal is generated.

Methods of using the disclosed actuation systems also are contemplated herein. In some embodiments, the methods are performed in order to prevent actuation of a base device upon a non-target substrate. The disclosed methods may include the following step: (a) receiving and storing a profile signal of a target substrate; (b) generating and transmitting a profile signal of a test substrate; (c) determining whether the profile signal of the test substrate corresponds to the profile signal of the target substrate; (d) generating an actuation signal if the profile signal of the test substrate corresponds to the profile signal of the target substrate; (e) permitting the base device to actuate when an actuation signal is generated; and (f) preventing the base device from actuating when no actuation signal is generated; where when the profile signal of the test substrate does not correspond to the profile signal of the target substrate, the test substrate is a non-target substrate. Optionally, the disclosed methods further may include, step (c)' receiving and storing a profile signal of a non-target substrate, and step (d)' determining whether the profile signal of the test substrate corresponds to the profile signal of the non-target substrate, where if the profile signal of the test substrate corresponds to the profile signal of the non-target substrate, the profile signal of the test substrate is determined to not correspond to the profile signal of the target substrate.

FIG. 1 depicts a device that includes an exemplary smart trigger system in accordance with the present disclosure. In particular, FIG. 1 discloses a pneumatic nail fastener tool known in the art, retrofitted after production to incorporate the smart trigger system of the present application. It should be recognized that the present disclosure may be retrofitted with other known tools and devices, or may be integrated into the base device itself during original manufacturing.

Figure 3:
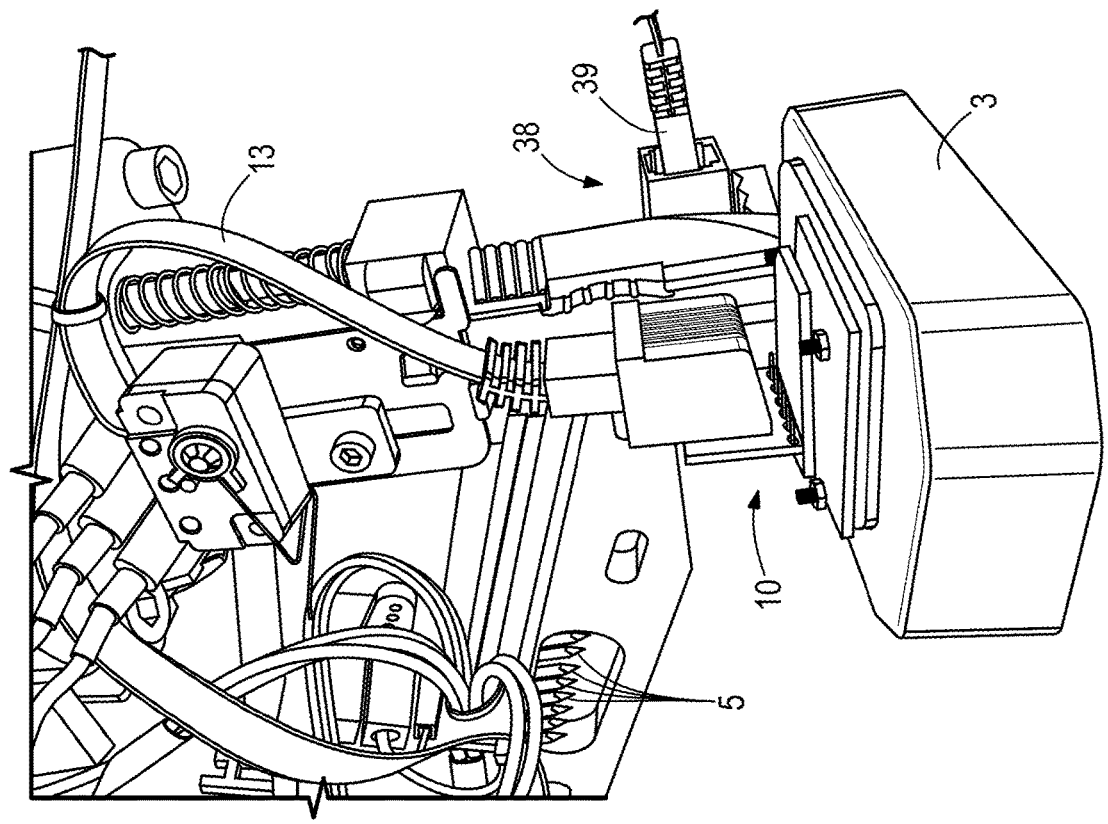
FIG. 3 is a magnified, perspective view of the front right side of the tool from FIG. 1.

The base device typically retains substantially all of its original functionality. As shown in the close-up of FIG. 3, the base device 1 includes a nosepiece 3 to be placed on the substrate. If the substrate matches a target profile signal a fastener 5 is discharged from the base device 1 through a discharge port 4 in the bottom of the nosepiece 3, which can be seen in FIG. 4. In standard operation of a CAT tool before the incorporation of the present invention, the operator actuates the base device 1 to discharge a fastener by squeezing an actuation trigger 2 while the nosepiece 3 is pressed and held onto the target substrate.

Incorporating the smart trigger system 8 of the present disclosure with the base device 1, the smart trigger system requires additional criteria beyond the base device requirements (i.e., from CAT or SAT systems) before the base device will discharge a fastener. As shown in FIG. 1, the smart trigger system 8 includes a detector 10, a processing unit 20 that contains a microcontroller, and an actuation unit 30 that together are designed to prevent accidental discharge of the base device 1 into an unintended, or non-target substrate. Specifically, the detector 10 is configured to generate and transmit a profile signal corresponding to the test substrate, which is defined as the substrate presently aligned to the discharge port 4, which would receive a fastener 5 if actuated successfully. A processing unit 20 in communication with the detector 10 through detector cable 13 receives the profile signal of the test substrate. In the exemplary system of FIG. 1, the processing unit 20 includes a main board 22 in communication with a second board 24 through a board cable 25. However, it should be recognized that the processing unit 20 could be further divided into additional boards, or combined into a single board.

The processing unit 20 is configured to receive the profile signal of the test substrate from the detector 10 and to determine whether the profile signal corresponds to the profile signal of a target substrate. The present inventors have found that the commercially available Arduino microcontroller with a rechargeable battery provided the necessary function of the processing unit 20. As stated above, a target substrate is a surface or object that the user intends to discharge a fastener into, in contrast to a non-target substrate, such as a user's hand or leg. In one embodiment, the profile signal of a target substrate, or profile signals from multiple acceptable target substrates, is provided to the processing unit 20 by placing the nosepiece 3 on the target substrate to be fastened and using the detector 10 to take an imprint of the target substrate. In alternative embodiments, the profile signal or profile signals may be pre-programmed in the processing unit 20, or could be provided to the processing unit 20 by such means as a barcode or other means, such as RFID, corresponding to or provided with the target substrate.

Figure 4:
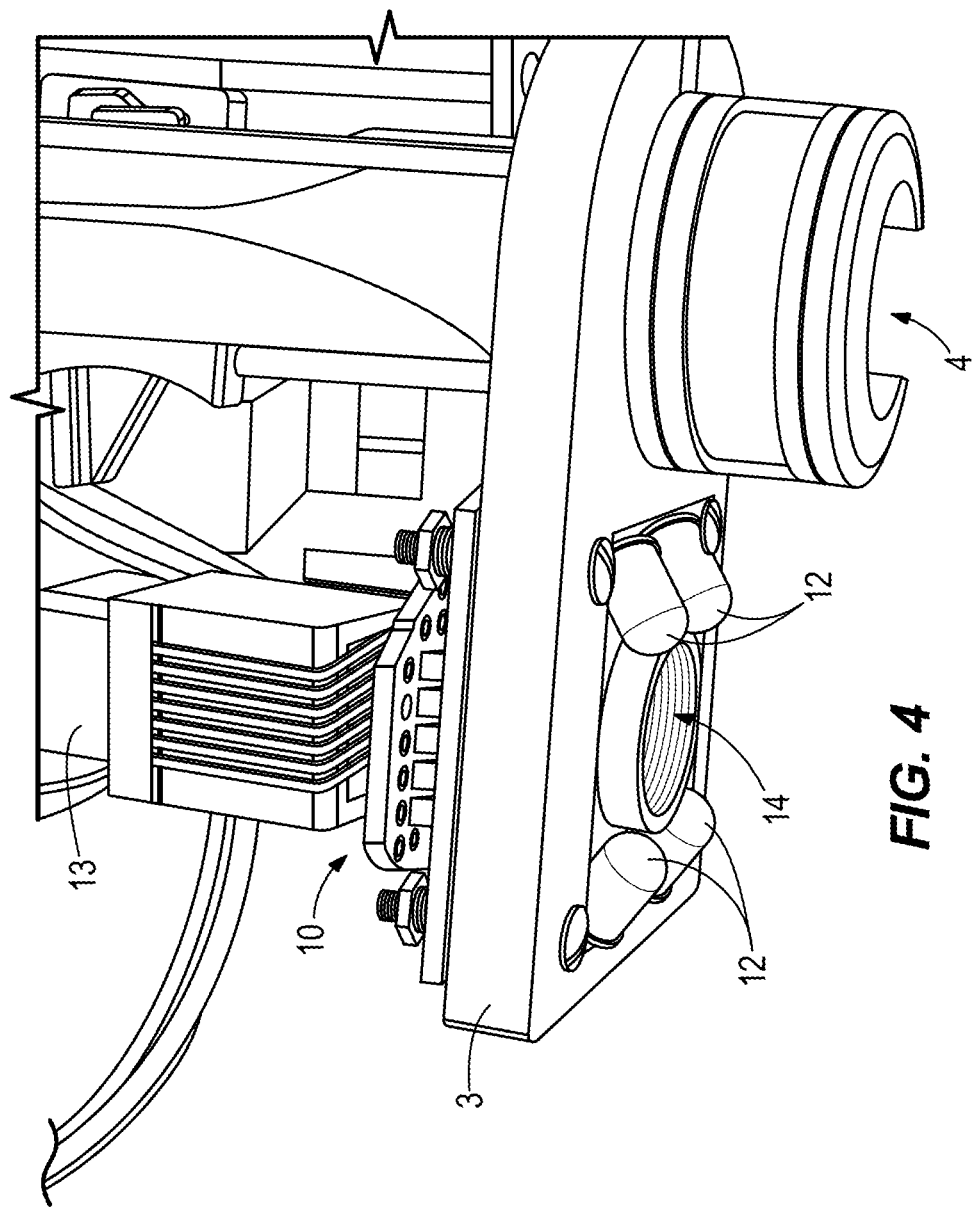
FIG. 4 is a magnified, perspective view of the front, bottom side of the tool from FIG. 1.

FIG. 4 shows an exemplary embodiment of the detector 10 integrated into the bottom side of the nosepiece 3. The detector 10 includes a light sensor 14 that detects the profile signal of a test substrate on or near the nosepiece 3. In one exemplary embodiment, the light sensor 14 is configured to measure the level of light illuminating the test substrate. The present applicants have found that commercially available light sensors, which detect the light intensity levels for light within four frequency ranges corresponding to red light, green light, blue light, and white (RGBW) light worked well for creating the profile signal imprint of the test substrate, namely $I_{red/test}$, $I_{green/test}$, $I_{blue/test}$, and $I_{white/test}$. Other means for generating a profile signal are also anticipated by the present disclosure, including detecting the intensities from a different quantity of colors, detecting the contrast of light reflected from the test substrate, and detecting the frequency range of light reflected from the test substrate.

It should be recognized that while this disclosure generally refers to visible light (i.e., those generally having wavelengths between 400-700 nanometers (nm)), other wavelengths of energy may also be used. For example, the detector may sense energy within different wavelength ranges, such as ultraviolet (10 nm-400 nm), infrared (700 nm-1 mm), or other ranges. It should also be recognized that this disclosure may describe energy by its wavelength, frequency, or photon energy.

Additionally, the exemplary embodiment of FIG. 4 incorporates four light emitters 12, which may be light emitting diodes (LEDs). While these light emitters are once again disclosed in reference to visible light, it should be recognized that the emitters may emit any wavelength of energy and will generally be configured to emit energy within a range that the detector can sense after the energy is reflected from the test substrate.

The light emitters 12, along with the light sensor 14, may be electrically connected to the processing unit 20 by detector cable 13 to provide both power and signal communication. The present applicants have determined that using light emitters 12 to illuminate the test substrate is advantageous for generating a profile signal of the test substrate using light sensor 14. Similarly, the present applicants have determined that it is advantageous to block light from sources other than the light emitters 12 from illuminating the test substrate though the addition of an enclosure. In one embodiment, a black, opaque shield was extended from the underside of the nosepiece 3 perimeter to minimize the light illuminating the test substrate other than from the light emitters 12.

In practice, the embodiment shown in FIG. 4 may be used as follows. First, the nosepiece 3 is pressed against a test substrate. Four LED light emitters 12 mounted around the light sensor 14 illuminate the surface of the test substrate for the light sensor 14 to measure the RGBW light levels reflected from the test substrate. A black enclosure surrounds the light emitters 12 and light sensor 14 in order to minimize ambient light from illuminating the test substrate. The light sensor 14 measures the light levels of each color (for example, RGBW) on the test substrate, according to an integer scale from 0 to 255. The light sensor 14 then sends these four RGBW levels to the processing unit 20 as the detected profile signal for the test substrate.

When a user desires to define the profile signal of a test substrate as an allowable profile signal corresponding to an intended target substrate, the RGBW profile signal can be sensed and stored within the processing unit 20. This may also be referred to as calibration. In the embodiment shown in FIG. 1, a user initiates the calibration process to input an allowable target substrate profile by first pressing the calibration button 23 on the processing unit 20 main board 22. The nosepiece 3 is then pressed onto the intended work piece or surface and the user pulls the actuation trigger 2 to capture the imprint of the surface as a profile signal.

After at least one target substrate profile signal is stored in the processing unit 20, the smart trigger system 8 may permit or prevent the base device 1 from discharging a fastener, subject to comparison of the target profile signal with the current test substrate. A user intending to discharge a fastener into a test substrate material presses the base device 1 nosepiece 3 against the test substrate. The RGBW light levels of the test substrate are sent as a profile signal of the test substrate to the processing unit 20 and compared to the profile signal or profile signals of RGBW levels from the calibrated, allowable target substrate or target substrates. An exemplary comparison analysis is described in detail below.

If the analysis within the processing unit 20 determines that there is a match between the new set of RGBW light levels from the profile signal of the test substrate and the profile signal of the target substrate, the processing unit 20 will generate an actuation signal, indicating allowability to discharge a fastener into the test substrate upon actuation by the actuation trigger 2.

If instead the new profile signal from the test substrate does not suitably match the RGBW levels in the profile signal of the target substrate, the processing unit 20 does not generate an actuation signal, which will prevent, or not allow, the base device 1 to insert or discharge a fastener. An exemplary mechanism for allowing or preventing the base device 1 from discharging a fastener is described in detail below.

In other embodiments, the processing unit 20 may store and contain profile signals of non-target substrates. This may be in place of, or in addition to comparison to allowable profile signals of target substrates. In other words, the processing unit 20 may also store and compare the profile signal of the test substrate to one or more profile signals of substrates that are classified as non-target substrates, that is, those that should not receive fasteners. These profile signals for non-target substrates can also be referred to as "lock-out" profile signals.

It is further contemplated that the profile signals for allowable target substrates, for non-target substrates, or both, may themselves be locked to prevent modification by users. For example, adding to, removing, or changing the stored target profile signals or non-target profile signals may be restricted to authorized personnel only, such as the management of a construction company or a supervising foreperson.

The allowable range for the test substrate profile signals to be considered a match to the target substrate profile signals may be set to accommodate variances in intended materials, changes in lighting conditions, or the impacts of environmental variables on the smart trigger system 8, such as temperature or humidity. In one embodiment, this allowable range is preprogrammed, for instance, as a threshold or percent variance between the profile signals of a test substrate and a target substrate for the processing unit 20 to generate an actuation signal. For example, this allowable range may be within the range of 0%-5% for a ratio of light intensities (I) for each the four frequency ranges corresponding to red light, green light, blue light, and white light, namely Comparison Error Ratios: $R_{red}=(I_{red/target}-I_{red/test})/I_{red/target}$; $R_{green}=(I_{green/target}-I_{green/test})/I_{green/target}$; $R_{blue}=(I_{blue/target}-I_{blue/test})/I_{blue/target}$; and $R_{white}=(I_{white/target}-I_{white/test})/I_{white/target}$ where, for instance, red/target is the red color intensity measurement of the target substrate profile signal and red/test is the red color intensity measurement of the test substrate profile signal (and similarly for the other frequency ranges). In this embodiment, the processing unit 20 generates an actuation signal when each of the following equations are satisfied: $R_{red}<V$; $R_{green}<V$; $R_{blue}<V$; and $R_{white}<V$ with variable value V set to ≤5% in the present example.

Other bases for comparison are also anticipated by the present disclosure, including the subtraction of test substrate and target substrate color intensities or the use of other ratios or mathematical functions. Furthermore, the allowable range may also vary to accommodate different applications, such as those having high material variability. Similarly, a disallowed range may be employed to compare the profile signal of a test substrate to a non-target substrate, preferably 0%-5% as stated above. In either case, the allowable or disallowed range may be varied as a pre-set adjustment, or through the use of an adjustable modulator.

In further embodiments, the specific characteristics of the light emitters 12, such as the expected RGBW levels, may be incorporated into the processing unit 20 comparison of profile signals from the test substrate and a target substrate. For example, the light emitters 12 may be expected to create minimum or maximum RGBW levels to be detected by the light sensor 14. In such an example, profile signals from the light sensor 14 that are outside of these minimum or maximum values may indicate that an error has occurred within the smart trigger system 8.

The smart trigger system further includes an actuation unit 30 in communication with the processing unit 20 through a discharge controller cable 34 and is configured to receive the actuation signal from the processing unit 20. The actuation unit 30 also engages with the base device 1, whereby the actuation unit 30 prevents actuation of the base device 1 when the actuation unit 30 is not receiving an actuation signal from the processing unit 20. In this regard, the smart trigger system 8 prevents the base device 1 from actuating to discharge a fastener unless the discharge port 4 is positioned to discharge the fastener 5 into an intended target substrate.

Figure 5:
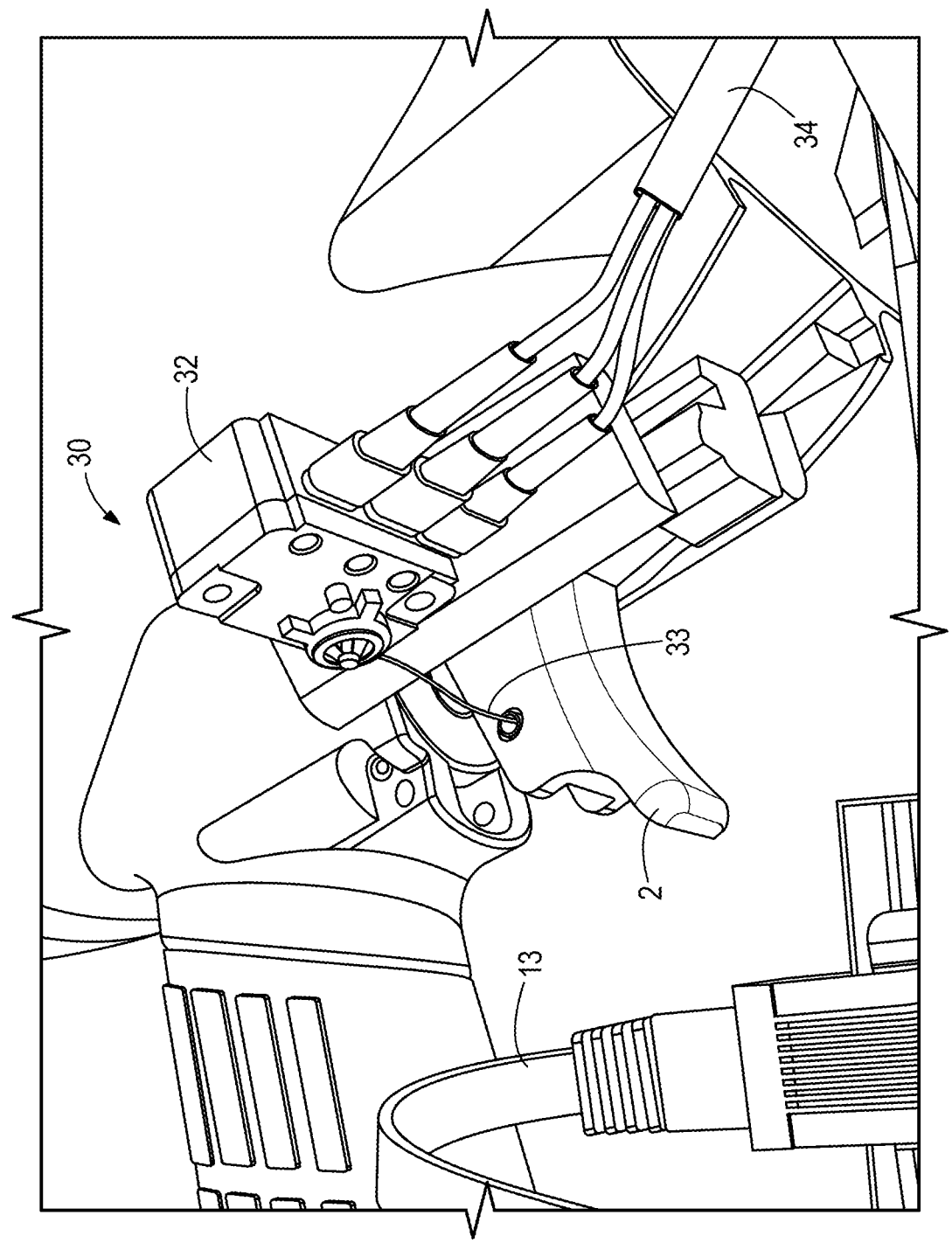
FIG. 5 is a magnified, perspective view from the right side of the tool from FIG. 1.

FIG. 5 depicts one exemplary embodiment wherein the actuation unit 30 has a discharge controller 32 mounted proximally to the actuation trigger 2. The discharge controller 32 communicates with the processing unit 20 through a discharge controller cable 34. In the embodiment shown, the discharge controller cable 34 is connected to the second board 24 of the processing unit 20, though alternative board configurations are contemplated by this disclosure as discussed above.

In the embodiment shown, when the discharge controller 32 receives an actuation signal from the processing unit 20, a servomotor within the discharge controller 32 pushes a thin discharge trigger wire 33 that extends into a hole within the actuation trigger 2. This discharge trigger wire 33 then actuates a button (not shown) inside the actuation trigger 2 of the stock, base device 1 that allows the base device 1 to discharge a fastener 5. Conversely, when the discharge controller 32 is not receiving an actuation signal from the processing unit 20, the discharge controller 32 does not actuate the button inside the actuation trigger 2, thereby preventing the base device 1 from discharging a fastener 5.

As stated above, the embodiment shown depicts a smart trigger system 8 that was retroactively added to a base device 1. Accordingly, the specific method for preventing a base device from discharging a fastener, whether retroactively fitted with a smart trigger system or with the smart trigger system integrated into a combined original device, may vary according to the specific device. Accommodations for such variations would be readily understood within the field and are anticipated within the scope of this disclosure.

Figure 2:
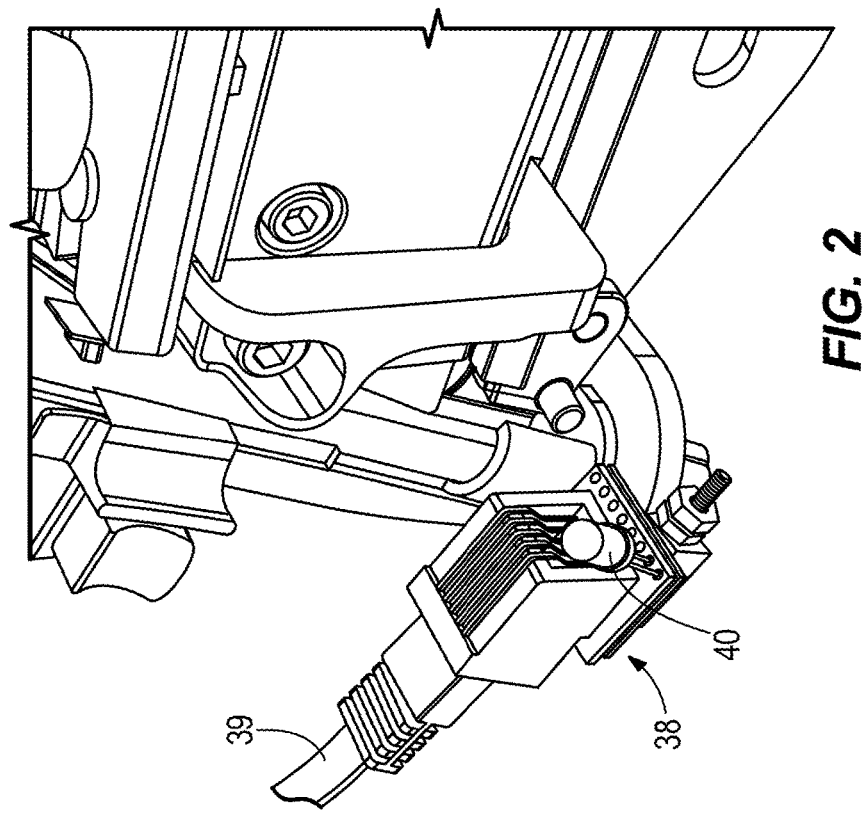
FIG. 2 is a magnified, perspective view of the front left side of the tool from FIG. 1.

FIG. 2 depicts an optional feature of the presently disclosed smart trigger system, a status indicator 38 in communication with the processing unit 20 through the status indicator cable 39. The status indicator 38 may include a light emitting diode (LED) 40 to indicate the status of the smart trigger system 8. In exemplary embodiments of the present disclosure, the LED 40 of the status indicator 38 may be illuminated in a first color to indicate that the base unit is powered and ready for calibration, a second color when the base device has been calibrated and is ready for use, a third color when the profile signal of a test substrate matches a target profile signal and a fastener is discharged, and a fourth color to indicate an error has occurred.

The present applicants conducted substantial experimentation while developing the subject matter of this present disclosure. In one experiment, a stock Bostitch nailing tool was used as the base device 1. The allowable range for the processing unit 20 comparison was set to ±1.5% of the RGBW light intensities of the test substrate profile signal to detect the target substrate profile signal imprinted during calibration. In other words, if the light sensor 14 measured a light level (0 to 255) within ±1.5% of the light level for each color (R, G, B, or W) of the target substrate profile signal, the measured test substrate was deemed to be an allowable target substrate. If any of the R, G, B, or W light levels was outside ±1.5% of the reference material (the calibrated, target substrate) light levels, the test substrate was deemed to not correspond to the allowable target substrate, preventing the base device 1 from discharging a fastener.

Testing Methodology—Accuracy, Sensitivity, and Specificity

A prototype of the systems disclosed herein was prepared and referred to as a smart trigger system. The smart trigger system then was tested in order to calculate its technical feasibility and accuracy. In the testing methodology, accuracy is defined as the system's capability to correctly identify whether a test substrate is a target substrate or a non-target substrate. If the test substrate is identified correctly as a target substrate, then the base device inserts a fastener into the target substrate. If a non-target substrate is identified correctly, then the base device does not allow the user to insert a fastener. Examples of non-target substrates are skin, blue jeans, and shirts, and also other materials not desired such as other wood or construction products.

The following are the four possible decisions of the smart trigger system:

True positive: a test substrate identified correctly as a target substrate:

False positive: a non-target substrate identified incorrectly as a target substrate. A false positive occurs when the base device inserts a fastener into a substrate that is not the target substrate. False positives are important because they can cause an acute injury, such as when the base device inserts a fastener into a body part (hand, arm, or leg);

True negative: a test substrate identified correctly as a non-target substrate; and False negative: a test substrate identified incorrectly as a non-target substrate. A false negative is a miss, which means the base device does not insert a fastener into the target substrate. False negatives are important because they can lead to a user's frustration (not being able to insert fasteners into the target substrate) and may lead to a user making unauthorized changes to a base device to override the trigger system.

Calculation of false positives and false negatives is a conventional method of measuring the sensitivity and specificity of a tool. "Sensitivity" is a measure of the true positive rate, or the proportion of times that the target substrate is identified correctly and the base device inserts a fastener into the target substrate. "Specificity" is the true negative rate, or the proportion of times that a substrate other than the target substrate is correctly identified and the base device does not allow a user to insert a fastener.

Test Fixture and Substrates: A tan colored asphalt shingle was mounted on a 4×8 ft plywood test fixture with a slope of 18° (4/12 pitch). The homogeneous tan portion of the shingle was chosen as the target substrate for the test. Tan is a common color of roof shingles (not too light, which shows dirt, and not too dark, which heats up the roof) and almost all roofers use pneumatic nail drivers to install roofing material. The test fixture is portable so it can be moved into various ambient lighting conditions.

Lighting Conditions: The prototype base device was tested in two ambient lighting conditions, indoors (473 lux) in the Ergonomics Lab (with overhead LED lights), Room 369, Engineering Hall, Marquette University, Milwaukee, Wis., and outdoors (behind Engineering Hall) on a partly cloudy day (15,691 lux). The sun light was not obstructed by any man-made object in the outdoors condition. Lux is the SI measure of illumination; one foot-candle (U.S. customary unit) of ilhurn'nation is equivalent to 10.87 lux. The illumination levels in lux were measured with a light meter.

Tool User: The tool user was a 22-year old, right-handed, male undergraduate engineering student from Minnesota who had experience using pneumatic nail drivers on construction sites. The user was a Caucasian with light-colored skin, reflecting his Scandinavian ancestry.

Target and Non-Target Substrates: The target substrate for the base device was the homogeneous tan portion of the shingle. Four other materials, called non-target substrates, were included in the test to determine if the base device had sufficient specificity to identify non-target substrates.

Color of blue jean material on the user's thigh. The blue jean material was of a medium denim blue color;
Skin color of palm of user's left hand;

Skin color of back (dorsal side) of user's left hand; and
Color of a conventional wooden 2×4 (not treated lumber).

Prototype Tool: The smart trigger system applied to a stock Bostitch nailing tool was fully functional when the experiment commenced. The air piston of the prototype tool was disabled so that it did not discharge a fastener when the smart trigger system correctly detected a target substrate (true positive) or incorrectly detected a non-target substrate and inserted a fastener (false positive). The air piston was disabled to eliminate the possibility of an accidental discharge of a fastener, which may have injured the experimenter and/or observer.

Experimental Protocol: There were 75 trials performed in each lighting condition, with each of the five substrates (the target substrate and four non-target substrates) repeated 15 times. The presentation order of the 75 trials was selected to eliminate carryover and learning effects.

The experiment started with the user calibrating the prototype tool to the tan-colored shingle. After the LED status light displayed a green color, the user then pressed the nosepiece of the prototype tool against the first test substrate in the sequence of 75 trials. An observer recorded which of the five substrates was being tested and whether the there was a blue light on the LED status light, which indicated whether the prototype tool would have discharged a fastener into the substrate. The absence of a blue light indicated that the prototype tool would not have discharged a fastener into the substrate. Then the user repeated the procedure on the remaining substrates until all 75 trials were completed.

Test Results and Interpretation

Indoors: Of the 75 trials, there were no false positives and two false negatives. Thus, the sensitivity was 86.7% (13 true positives/15 positive conditions), and the specificity was 100% (60 true negatives/60 negative conditions). The accuracy was 97.3% (73/75).

Outdoors: There were no false positives and no false negatives, resulting in sensitivity and specificity of 100%. The accuracy was 100% (75/75).

The results demonstrate the feasibility of the smart trigger system of the prototype tool in two tested lighting conditions with the tan shingle as the target substrate. The accuracy was at least 97.3%. The only errors were two false negatives in the indoor condition, which means that the smart trigger system was protective of the tool user. With false negative errors, the trigger system did not allow the tool to discharge a fastener even though the tool was pressed against the target substrate. A more serious error would have been false positives, in which case the tool would have discharged a fastener into a non-target substrate such as the tool user's hand or leg.

Preferably, the actuation systems and methods disclosed herein have a sensitivity of greater than about 95%, most preferably 100%. Preferably, the actuation systems and method disclosed herein have a specificity of greater than about 95%, most preferably 100%. Preferably,the actuation systems and method disclosed herein have an accuracy of greater than about 95%, most preferably 100%.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

It will be readily apparent to one skilled in the art that varying substitutions and modifications may be made to the invention disclosed herein without departing from the scope and spirit of the invention. The invention illustratively described herein suitably may be practiced in the absence of any element or elements, limitation or limitations which is not specifically disclosed herein. The terms and expressions which have been employed are used as terms of description and not of limitation, and there is no intention in the use of such terms and expressions of excluding any equivalents of the features shown and described or portions thereof, but it is recognized that various modifications are possible within the scope of the invention. Thus, it should be understood that although the present invention has been illustrated by specific embodiments and optional features, modification and/or variation of the concepts herein disclosed may be resorted to by those skilled in the art, and that such modifications and variations are considered to be within the scope of this invention.

Citations to a number of patent and non-patent references may be made herein. The cited references are incorporated by reference herein in their entireties. In the event that there is an inconsistency between a definition of a term in the specification as compared to a definition of the term in a cited reference, the term should be interpreted based on the definition in the specification.

We claim:

1. An actuation system for preventing actuation of a base device upon a non-target substrate, the actuation system comprising:
    a detector configured to generate and transmit a profile signal of a test substrate, wherein the detector comprises an emitter element for emitting energy on the test substrate and a sensor element for detecting energy reflected from the test substrate, the sensor element generating the profile signal for the test substrate based on the detected energy reflected from the test substrate;
    a processing unit in communication with the detector and configured to receive the profile signal of the test substrate from the detector, wherein the processing unit is configured to receive from a user of the actuation system a profile signal of a target substrate, and wherein the processing unit is configured to determine whether the profile signal of the test substrate corresponds to the profile signal of the target substrate, and wherein the profile signal of the target substrate is transmitted and stored in the processing unit, and to generate an actuation signal if the profile signal of the test substrate corresponds to the profile signal of the target substrate; and
    an actuation unit in communication with the processing unit and the base device, the actuation unit being configured to receive the actuation signal from the processing unit and to permit the base device to actuate only when receiving the actuation signal.

2. The actuation system of claim 1, wherein the non-target substrate is clothing.

3. The actuation system of claim 1, wherein the processing unit determines whether the profile signal of the test substrate corresponds to a profile signal of a target substrate, wherein the processing unit will permits the base device to discharge a fastener only when the profile signal of the test substrate corresponds to the profile signal of the target substrate.

4. The actuation system of claim 1, wherein the emitter element is a light emitter that emits light within four frequency ranges corresponding to red light, green light, blue light, and white light, and wherein the light sensor senses light within the four frequency ranges and determines light intensity levels for light within each of the four frequency ranges, namely $I_{red/test}$, $I_{green/test}$, $I_{blue/test}$, and $I_{white/test}$, to generate the profile signal of the test substrate.

5. The actuation system of claim 4, wherein the profile signal of the target substrate comprises light intensity levels for light within each of the four frequency ranges corresponding to red light, green light, blue light, and white light, namely $I_{red/target}$, $I_{green/target}$, $I_{blue/target}$, and $I_{white/target}$, and wherein the processing unit compares each of the light intensity levels of the profile signal of the test substrate with each the corresponding light intensity levels of the profile signal of the target substrate to generate comparison error ratios, namely $R_{red}=(I_{red/target}-I_{red/test})/I_{red/target}$; $R_{green}=(I_{green/target}-I_{green/test})/I_{green/target}$; $R_{blue}=(I_{blue/target}-I_{blue/test})/I_{blue/target}$; and $R_{white}=(I_{white/target}-I_{white/test})/I_{white/target}$.

6. The actuation system of claim 5, wherein the processing unit determines that the profile signal of the test substrate corresponds to the profile signal of the target substrate when each of the following equations are satisfied: $R_{red}<V$; $R_{green}<V$; $R_{blue}<V$; and $R_{white}<V$; wherein V is a variable value.

7. The actuation system of claim 6, wherein the actuation system further comprises a modulator for changing the value of variable V.

8. The actuation system of claim 7, wherein the variable value V is selected from within the range of 0-5%.

9. The actuation system of claim 1, wherein the base device is a fastening device that discharges a fastener.

10. The actuation system of claim 1, wherein the processing units receives the profile signal of the target substrate from the user by scanning at least one or a barcode and a tag associated with the target substrate.

11. The actuation system of claim 10, wherein the processing units receives the profile signal of the target substrate via the detector.

12. The actuation system of claim 1, wherein the processing unit also receives a profile signal for the non-target substrate, and wherein the actuation unit is prevented from actuating when the profile signal of the test substrate corresponds to the profile signal for the non-target substrate.

13. The actuation system of claim 12, wherein the profile signal for the non-target substrate is provided by the user.

14. The actuation system of claim 12, wherein the profile signal for the non-target substrate is multiple profile signals corresponding to multiple non-target substrates, and wherein the multiple non-target substrates include clothing.

15. The actuation system of claim 12, wherein the processing units receives the profile signal of the non-target substrate from the user via the detector.

16. The actuation system of claim 1, wherein the emitter element is a light emitter element and the sensor element is a light sensor element, and either of the profile signal of the test substrate or the profile signal of the target substrate is generated based on one or more of: detecting the frequency range of light reflected from the test substrate, detecting the contrast of light reflected from the substrate, detecting the intensity of light reflected from the substrate, or a combination thereof, and wherein the processing units receives the profile signal of the target substrate via the detector.

* * * * *